UNITED STATES PATENT OFFICE.

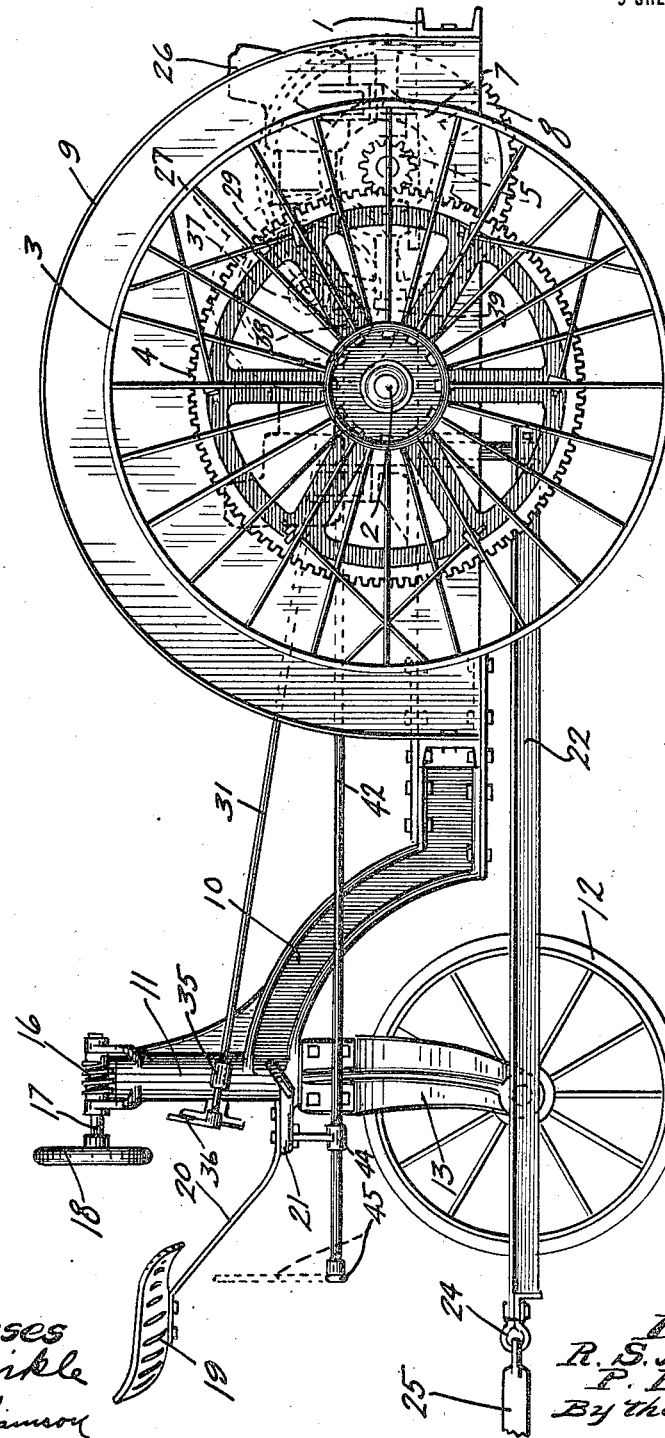

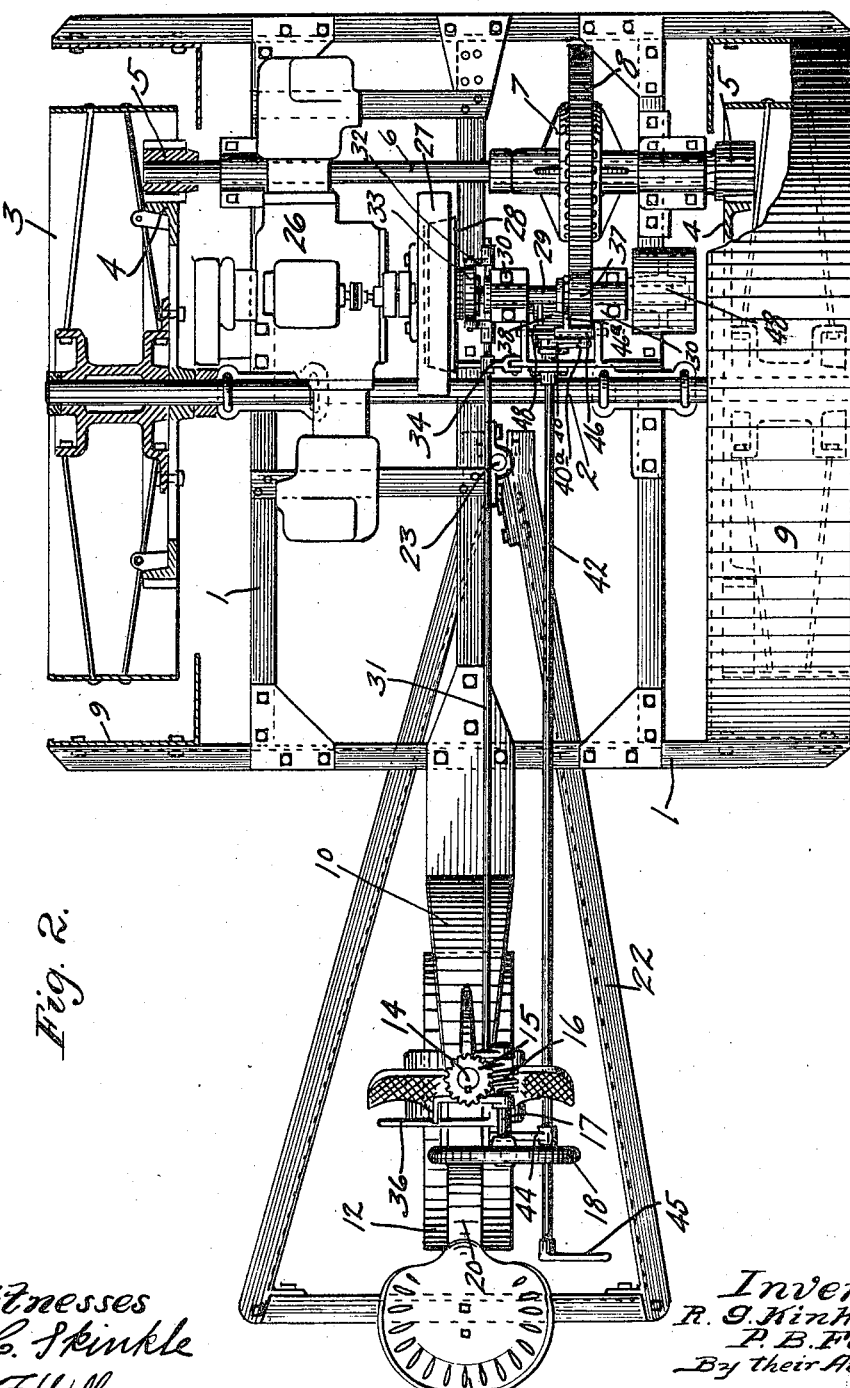

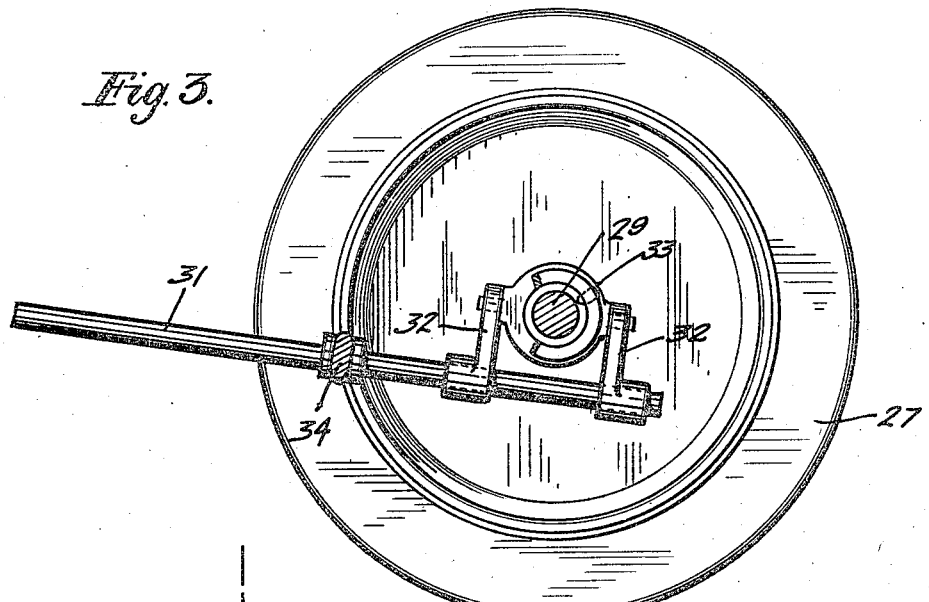
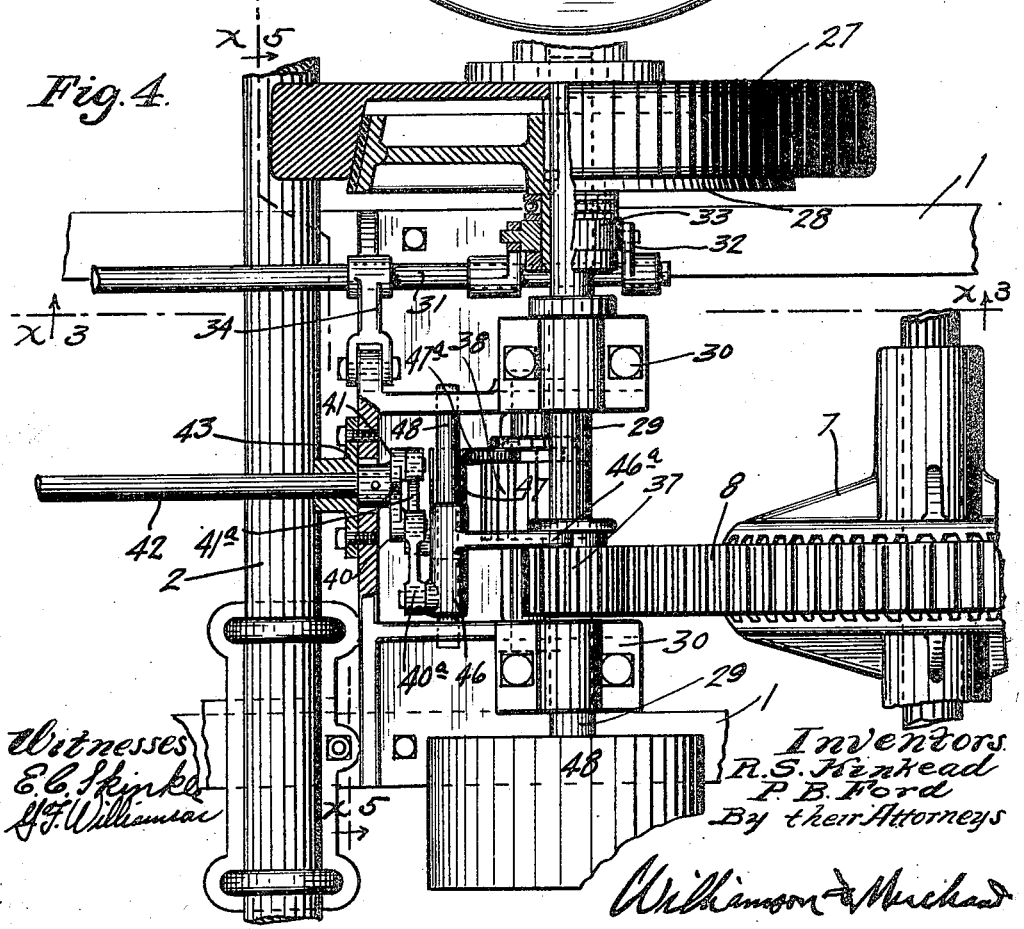

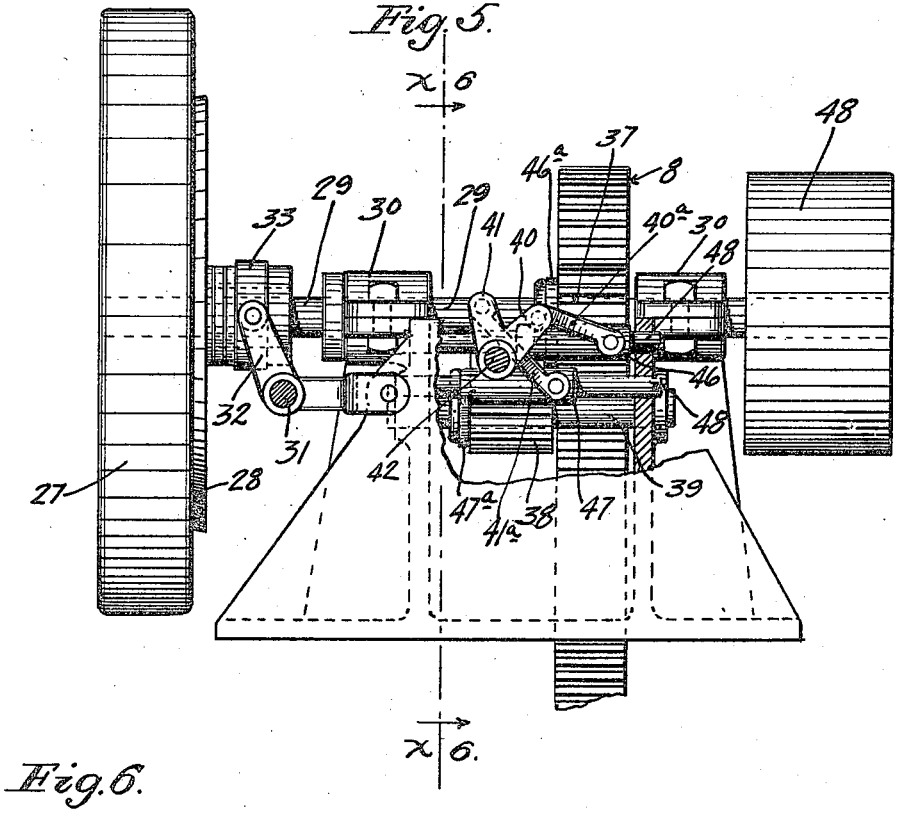
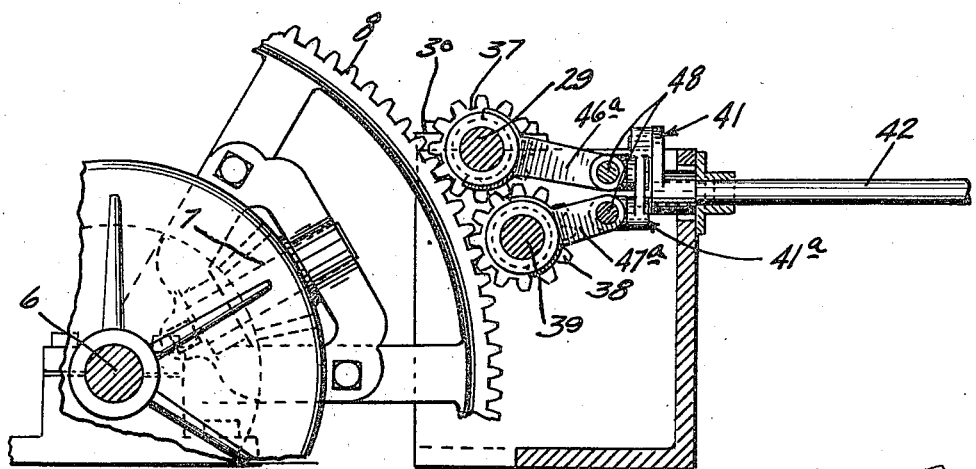

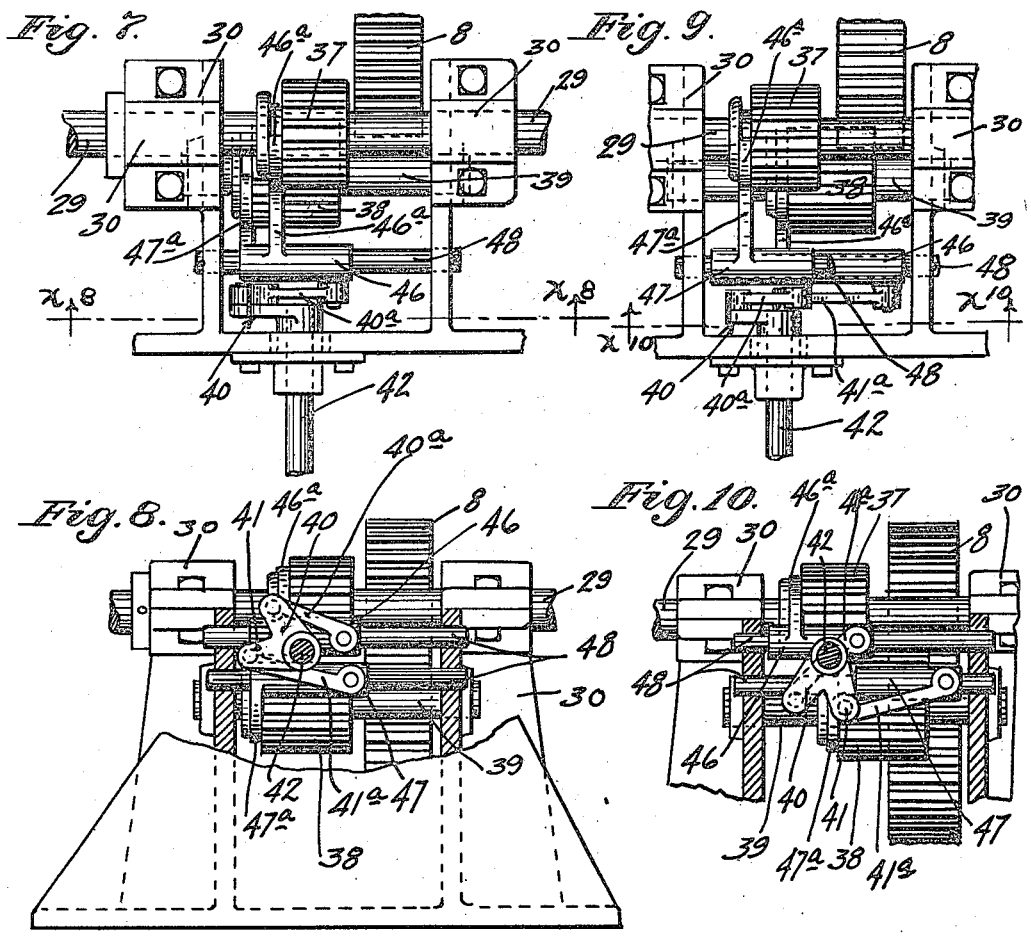
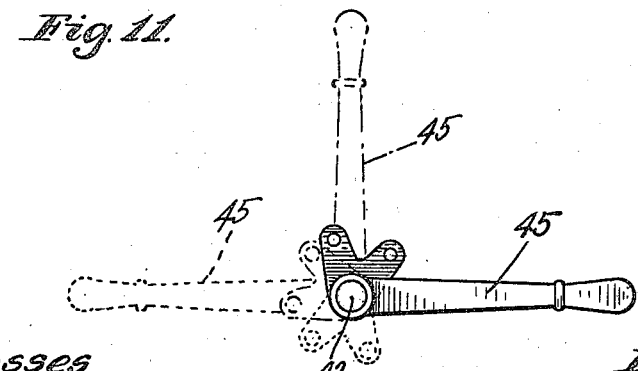

ROBERT STANARD KINKEAD AND PAUL BOYNTON FORD, OF MINNEAPOLIS, MINNESOTA, ASSIGNORS TO WILLIAM BAER EWING, OF MINNEAPOLIS, MINNESOTA.

TRACTOR.

1,243,184.   Specification of Letters Patent.   Patented Oct. 16, 1917.

Application filed October 18, 1915. Serial No. 56,366.

*To all whom it may concern:*

Be it known that we, ROBERT STANARD KINKEAD and PAUL BOYNTON FORD, citizens of the United States, residing at Minneapolis, in the county of Hennepin and State of Minnesota, have invented certain new and useful Improvements in Tractors; and we do hereby declare the following to be a full, clear, and exact description of the invention, such as will enable others skilled in the art to which it appertains to make and use the same.

Our invention has for its object to provide an extremely simple and highly efficient tractor of small cost adapted to be made in different sizes, but is particularly adapted for drawing from two to four plows and for doing various other kinds of work required of a small size tractor. Generally stated, the invention consists of the novel devices and combinations of devices hereinafter described and defined in the claims.

This improved tractor is of the three-wheeled type and has two front traction wheels driven from an explosive engine through suitable differential transmission mechanism, and is provided with a rear steering wheel located on a line centrally between the said traction wheels.

In the accompanying drawings which illustrate the invention, like characters indicate like parts throughout the several views.

Referring to the drawings:

Figure 1 is a right side elevation of the improved tractor;

Fig. 2 shows the tractor chiefly in plan, but with some parts in horizontal section and with some parts broken away;

Fig. 3 is a vertical section taken on the line $x^3$ $x^3$ on Fig. 4;

Fig. 4 is a detail view chiefly in plan but with some parts in horizontal section and some parts broken away showing the transmission mechanism;

Fig. 5 is a transverse vertical section taken approximately on the irregular line $x^5$ $x^5$ on Fig. 4, some parts being broken away;

Fig. 6 is a section on the line $x^6$ $x^6$ on Fig. 5, some parts being broken away;

Fig. 7 is a plan view showing a reverse gear mechanism;

Fig. 8 is a view partly in elevation and partly in vertical section on the line $x^8$ $x^8$ on Fig. 7;

Fig. 9 is a view corresponding to Fig. 7 illustrating different positions of the parts;

Fig. 10 is a section taken on the line $x^{10}$ $x^{10}$ on Fig. 9, the body of the parts corresponding to Fig. 9; and Fig. 11 is a detail view in elevation showing the reverse gear actuating lever.

The framework 1 of the tractor is preferably a rectangular skeleton structure made up of commercial rolled steel bars properly braced and reinforced by suitable gusset plates and cross bars. Rigidly secured to this frame 1, extending transversely of the central portion thereof, is a main axle 2, on the ends of which, the front or traction wheels 3 are loosely journaled and, of course, held against endwise displacement. These traction wheels carry large external gears 4 that mesh with pinions 5 of a transversely extended divided axle 6 journaled in suitable bearings on the forward portion of the frame 1. The two sections of this divided shaft 6 are connected through a differential gear 7 of usual construction and the master gear of which is indicated at 8. As shown, the traction wheels 3 are covered by light metal hoods 9 secured to the sides of the frame 1.

Rigidly secured to the central rear portion of the frame 1 is a rearwardly and upwardly extended arm 10 preferably, and as shown, in the form of a strong ribbed casting having at its rear end an upright bearing sleeve 11. The rear steering wheel 12 is small, as compared with the front traction wheels and it is journaled in a forked wheel bracket 13 having an upwardly extended shaft or stem 14 journaled in the sleeve 11 of the arm 10 and provided at its extreme upper end with a worm gear 15 that meshes with the worm 16 of a short shaft 17 journaled in upwardly projecting prongs of the sleeve 11. This worm shaft 17, at its rear end, has a hand wheel 18 that is within easy reach of the driver's seat 19, the supporting bar 20 of which is secured to a lug 21 on the lower end of the said bearing sleeve 11.

A yoke-like draw bar or frame 22 embraces the rear steering wheel 12 with ample clearance to permit the steering action, and at its front end, is pivotally connected to the central portion of the frame 1, at a point far below the axes of the traction wheels 3, as shown, by means of a heavy depending swivel pin 23. In practice, the draw bar or frame 22 would usually be given more clearance from the steering wheel 12 than shown in the drawings. At its rear end, it is provided with a heavy eye 24, or other coupling device to which a gang plow or the pole 25 of a vehicle to be drawn, is adapted to be coupled. This eye or coupling device 24 is shown as directly riveted to the central portion of a flanged transverse bar of said frame 22.

The reversible transmission mechanism herein illustrated involves, *per se*, novel features which are made the subject matter of a companion application filed by Robert S. Kinkead, of even date herewith, entitled "Variable transmission mechanism for tractors."

The numeral 26 indicates an explosive or internal combustion engine, shown as of the horizontally opposed cylinder type properly mounted on the frame 1. The crank shaft of this engine carries an internal cone clutch wheel 27 that is adapted to be frictionally engaged and disengaged by a clutch cone 28, which latter is keyed to slide on, but rotate with, a shaft 29 axially alined with the engine crank shaft and journaled on a suitable bearing bracket 30 rigidly secured on the frame 1. The sliding clutch cone 28 is adapted to be shifted to and from operative position, at will, by means of an oscillating actuating rod 31 provided at its front end with an arm 32 pivoted to a collar 33 swiveled on the hub of the said cone 28. The front end of this rod 31 is journaled in an arm 34 connected to a flange of the bracket 30, and at its rear end, said rod is journaled in a lug 35 on the upright bearing sleeve 11. At its extreme rear end, the said rod 31 is provided with a lever or hand-piece 36 by means of which it may be oscillated.

The numeral 37 indicates a pinion carried to rotate with, but slide upon the shaft 29 and adapted to be slid into and out of mesh with the master wheel 8 of the differential gear 7. When the tractor is driven forward, power is transmitted from the engine crank shaft and shaft 29, to the master wheel 8 of the differential gear, directly through the said pinion 37, and for direct forward drive no other gear is required. However, for reverse drive, we provide a second pinion 38 which is like the pinion 37 and is positioned for axial movement into and out of mesh with the master gear 8 of the differential, and into and out of mesh with the said pinion 37. This pinion 38 is free to slide and rotate upon a shaft or spindle 39, the ends of which are secured in the prongs of the bearing bracket 30. Means is provided for sliding the pinions 37 and 38 in such manner that when said pinion 37 is in mesh with the master gear 8 the pinion 38 will be moved out of engagement therewith, and on the other hand, when the pinion 38 is slid into mesh with the said master gear and with the said pinion 37, said pinion 37 will be slid out of mesh with the said master gear, so that then the tractor will be driven backward. The device for accomplishing these movements of the said pinions involves novelty. As preferably arranged, it comprises two arms 40 and 41 shown as in the form of a bell crank secured to a rock shaft or operating rod 42 journaled in a bearing 43 on the bearing bracket 30, and in the bearing 44 on the lug 21 of the upright sleeve 11. At its rear end, this rock shaft 42 is provided with an operating lever or hand-piece 45, by means of which it may be readily oscillated. The arms 40 and 41, respectively, are connected by links 40ª and 41ª, to sleeves 46 and 47 on guide rods 48 rigidly secured to the prongs of the bearing bracket 30. The said sleeves 46 and 47 are provided, respectively, with projecting arms 46ª and 47ª, the ends of which are forked and engage loosely in annular grooves formed in the hubs of the pinions 37 and 38, respectively.

In view of the fact that the arms 40 and 41 are set, one ahead of the other, the pinions 37 and 38 will be given differential sliding movements so as to cause the said pinions to be engaged with each other and with the master gear 8 in the manner above indicated. Figs. 5, 8 and 10 illustrate three different positions of the said gears and pinions. Fig. 5 shows the said gears adjusted, causing the engine to drive the tractor forward. Fig. 8 shows both pinions 37 and 38 out of mesh with the master gear 8 so that the shaft 29 may be driven from the engine without driving the tractor, as for example, when required to transmit power from the engine for various farm or commercial purposes, using the tractor as a stationary engine, at which time the power will be transmitted from a pulley 48 on the outer end of the said shaft 29. Fig. 10 shows the said gears and pinions adjusted for causing the engine to drive the tractor backward.

With the above described arrangement, the driver or operator on the seat 19 is in position where he obtains the best possible view forward between the traction wheels and hoods, and he is within easy reach both of the steering mechanism and friction clutch actuating device and the reversing device. The draft yoke or frame 22 is capable of swinging into the direct line of draft except when traveling abrupt curves. Suitable stops, not shown, may, of course, be provided for limiting the oscillating movements of said draft yoke or frame, but such are not absolutely necessary because no harm will be done when the said frame is thrown for a short time into contact with the steering wheel.

The power of the engine exerted on the traction wheels will tend to raise the front portion of the frame 1 and to throw the steering wheel downward onto the ground with a force increasing and decreasing with the steering required to draw the load; but with the draw frame connected to the tractor frame below the axes of the traction wheels. This force is offset so that an approximately constant load will be carried on the steering wheel. Furthermore, the engine is located forward of the axes of the traction wheels so that it will counterpoise, to a considerable extent, the weight on the steering wheel, thereby relieving the same from all load except that required for the proper steering action and throwing the maximum permissible load on the traction wheels for traction purposes. The tractor is of very simple and cheap construction and, in practice, has been found highly efficient for the purposes had in view.

What we claim is:

1. In a tractor, the combination with a frame, laterally spaced front traction wheels and a centrally located rear steering wheel, of a draw bar pivotally connected to said frame in front of said steering wheel and extending to a point at the rear of said steering wheel, and an engine on said frame having connections for driving said traction wheels.

2. In a tractor, the combination with a frame, laterally spaced front traction wheels and a centrally located rear steering wheel, of a draw bar pivotally connected to said frame in front of said steering wheel and extending to the rear of said steering wheel, an engine on said frame, and transmission mechanism including a differential gear connecting said engine to said traction wheels.

3. In a tractor, the combination with a frame, front traction wheels and a rear steering wheel, of a draw bar pivotally connected to said tractor frame forward of said steering wheel and having a rear portion movable directly in the rear of said steering wheel.

4. In a tractor, the combination with a frame, front traction wheels, and a rear steering wheel, of a yoke-like draw bar pivotally connected to said frame forward of said steering wheel and extending rearward on both sides of said steering wheel and having a transverse portion located at the rear of said steering wheel.

5. In a tractor, the combination with a frame, front traction wheels and a rear steering wheel, the latter being located on a line extending centrally between said traction wheels and having means for oscillating the same, of a yoke-like draw bar completely embracing said rear steering wheel and pivotally connected to said frame at a point in front of said steering wheel and below the axes of said traction wheels.

6. In a tractor, the combination with a frame having a rigid rearwardly extended arm, of laterally spaced front traction wheels journaled to said frame, a steering wheel swiveled to the rear end of said arm, a seat supported by said arm at the rear of said steering wheel, means for oscillating said steering wheel including a hand-piece within reach of said seat, an engine on said frame having connections for driving said traction wheels, and a draw bar pivotally connected to said frame in front of said steering wheel and extending rearward.

In testimony whereof we affix our signatures in presence of two witnesses.

ROBERT STANARD KINKEAD.
PAUL BOYNTON FORD.

Witnesses:
  Geo. M. Seward,
  M. A. Phillips.